Patented July 10, 1951

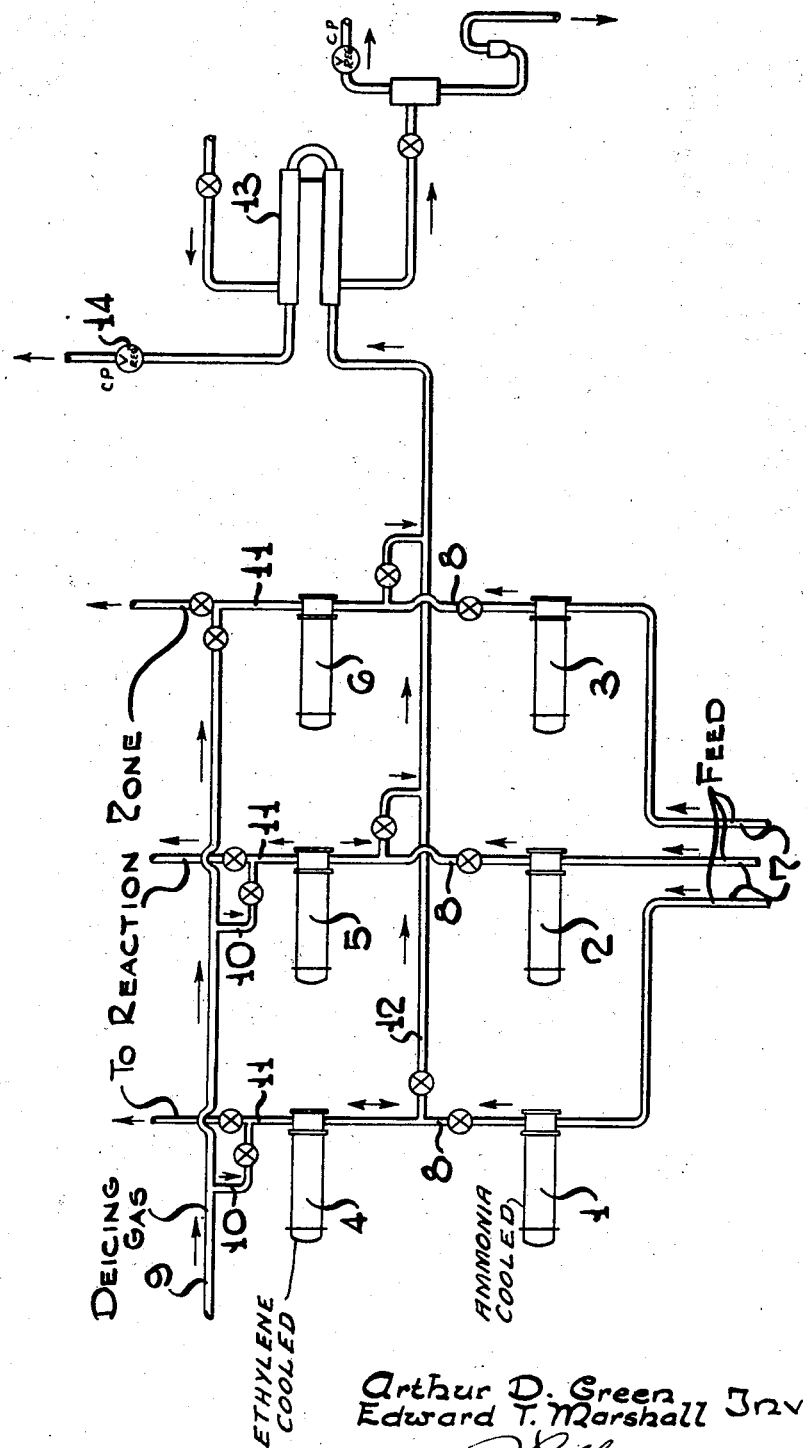

2,560,340

UNITED STATES PATENT OFFICE 2,560,340

POLYMERIZATION PROCESS

Arthur D. Green and Edward T. Marshall, Cranford, N. J., assignors to Standard Oil Development Company, a corporation of Delaware Application August 1, 1945, Serial No. 608,324

2 Claims. (Cl. 62—1)

This invention relates to industrial chillers and relates more particularly to a method for de-icing such industrial chillers.

Refrigeration is commonly used in many industrial processes. The type of refrigerant used depends on the temperature desired and the conditions under which it is used. Sulfur dioxide is mostly used for home refrigeration while ammonia is the most widely used in industrial refrigeration. However, lower temperatures even than can be obtained by ammonia refrigeration are required in certain industrial processes, such as in the manufacture of synthetic rubber. If, as often happens, the material being refrigerated contains water, the internal walls of the unit become, in time, so coated with ice that it is necessary to shut down and melt the ice from the walls. This is often accomplished by passing a warm material through the cooling units while the refrigerant is cut off. This material may be and in many cases is the material which it is desired to chill. This method, however, has the disadvantage that large volumes of fluid are required to remove the ice with the result that the compressors, dryers, fractionating equipment and other auxiliary equipment are subjected to periodic increases in flow of considerable magnitude. These intermittent high flow periods cause unsteady operation of all the equipment and even overloading. In addition the water removal is not complete and the water which is removed is frequently lodged in the piping downstream from the chillers.

It is the main object of this invention to overcome the above disadvantages by providing a method of more quickly and completely removing the ice from the inside walls of industrial chillers.

It is a further object of this invention to provide means for more completely removing the water from the system.

It is a further object of this invention to provide a method whereby smaller amounts of a de-icing material is used thereby preventing the disadvantages of periodic increases in flow through the system.

These and other objects of this invention are accomplished by using a gas as the de-icing material and employing it at a temperature above 0° C. and under such pressure that it boils above 0° C. whereby advantage can be taken of its latent heat of condensation to supply the necessary heat for melting the ice. Thus only a small amount of gas is needed. Since any gas is suitable, that most available may be used for the given case, sufficient pressure being applied to correct its boiling point if necessary. However, in order to prevent contamination of the feed material during the de-icing period subsequent to the refrigerating periods during which ice is formed, it is more practical to introduce a de-icing gas having a composition similar to that normally subjected to chilling.

The principle of this invention will now be described in connection with chillers used in the manufacture of the polymers, obtained by copolymerizing isoprene and isobutylene at temperatures between —160° C. and 0° C.

In this process a mixture of isoprene and isobutylene in the proportion of 5–0.5 parts of isoprene to 95–99.5 parts of isobutylene is mixed with a large amount of methyl chloride diluent. This mixture is then cooled first by ammonia refrigeration and then by ethylene refrigeration to —100 C. and conducted to a polymerization zone where it is contacted with aluminum chloride dissolved in methyl chloride as the catalyst. In the reaction zone, the isoprene and isobutylene react to form a slurry of polymer particles in the diluent liquid. This slurry is then discharged into a warm liquid such as water, whereby the unreacted constituents and diluent are volatilized and removed. These vapors are collected and recycled through the refrigeration unit to the reaction zone. These recycle gases consist of principally 85% methyl chloride and 15% isobutylene.

Referring, therefore, to the drawing there is shown a system of chillers 1, 2, 3, 4, 5 and 6 for cooling the feed mixture to be polymerized. Chillers 1, 2 and 3 are refrigerated with ammonia while chillers 4, 5 and 6 are refrigerated with liquid ethylene. The chillers shown in the drawing may be of any desired conventional design comprising coils exposed to the ethylene and ammonia refrigerant. It is in the liquid ethylene chillers 4, 5 and 6 in which the formation of ice is such a problem. In normal operation the feed to be polymerized comprising a mixture of preferably 99 parts of isobutylene, 0.5 part of isoprene and 300 parts of methyl chloride enters through lines 7 and passes first through the ammonia chillers 1, 2 and 3 and then by lines 8 to the ethylene chillers the flow being indicated by the solid arrows where they are reduced to the desired polymerization temperature, generally about —100° C. Since the feed material contains small amounts of water, the walls of the refrigeration units, particularly the ethylene chillers 4, 5 and 6 eventually become coated with ice and have to be shut down and de-iced. When this occurs, the feed to the chillers is stopped and the ethylene refrigerant is cut off. Dry gas is then introduced through line 9, branch lines 10 and line 11, the flow in this case being indicated by the open arrows. This gas may be any suitable gas but since large amounts of relatively high pressure recycle gas comprising methyl chloride which may contain 0-25% isobutene, and generally consists of a mixture of 85% methyl chloride and 15% isobutene, is available from the process, this is the most suitable gas for the purpose. The cold liquid condensate and water in the chillers is forced out by the entering gas into line 12 and thence into steam heater 13 where it is completely vaporized. Vaporized material flows from the heater through flow controller 14 and thence to storage. Flow controller 14 is adjusted to hold a pressure of about 140 lbs./sq. in. gauge on the system. The flow of gas through the system is limited to about 5-7% of that normally passed through the chillers for chilling. As the cold liquid is displaced out of the chillers, the incoming gas quickly condenses to provide heat to warm up the cooler since it has a condensation temperature of approximately 50° C. As soon as all the ice has melted and the water has been swept out, the chiller warms up to approximately 50° C. and the gas no longer condenses. The de-icing is then discontinued. The approach of this stage is indicated by the defrosting of the line 12 leaving the cooler. The gas flow is stopped, refrigeration is re-applied and feed material is reintroduced into the coolers through line 7. It is not necessary to flush out the process side of the chiller since the de-icing medium is substantially the same in composition as the feed to be cooled.

The foregoing description does not by any means cover the possible uses of this invention nor the forms which it may assume, but serves to illustrate its fundamental principles and an assembly in which the novel features as disclosed above have been incorporated. It is obvious that changes in the details may be made without departing from either its novel characteristics or the spirit and scope of the invention as defined in the appended claims. For example, the process has been described as applying to the de-icing of ethylene chillers in a process for preparing synthetic rubber, but it may also be applied to removal of ice from the ammonia chillers as well.

The nature and objects of the present invention having been thus described and illustrated, what is claimed as new and useful and is desired to be secured by Letters Patent is:

1. Process for melting ice from inside ethylene-refrigerated chillers used for refrigerating feed comprising isobutylene, isoprene and methyl chloride to a polymerization process for the manufacture of synthetic rubber comprising shutting off refrigeration, forcing out liquid from the chillers by means of a gas mixture of approximately 85% methyl chloride and 15% isobutene under a pressure such that the gas condenses above 0° C., continuously adding the gas to said chillers to force the liquid and melted water from the system into a heating zone until all the ice is melted and all the liquid and water is vaporized in said heating zone, stopping the flow of gas and resuming refrigeration.

2. In a polymerization process wherein a feed comprising isobutylene, isoprene and a methyl chloride diluent is chilled to below 0° C. in a chiller and wherein moisture present in said feed forms ice in said chiller causing clogging of the same, the method of removing said ice which comprises directly contacting said ice with a gas mixture of approximately 85% methyl chloride and 15% isobutene under pressure such that the gas condenses above 0° C., whereby said ice is melted to water, and continuously removing said water and said gas mixture until said chiller is substantially completely free of ice.

ARTHUR D. GREEN.
EDWARD T. MARSHALL.

REFERENCES CITED

The following references are of record in the file of this patent:

UNITED STATES PATENTS

| Number | Name | Date |
| --- | --- | --- |
| 85,719 | Tellier | Jan. 5, 1869 |
| 1,068,405 | Aubol | July 29, 1913 |
| 1,130,960 | Carter | Mar. 9, 1915 |
| 1,180,531 | Pownall | Apr. 25, 1916 |
| 1,979,682 | Frankl | Nov. 6, 1934 |
| 2,200,424 | Kubaugh | May 14, 1940 |